United States Patent
Bedeschi et al.

(10) Patent No.: US 12,055,383 B2
(45) Date of Patent: Aug. 6, 2024

(54) OPTICAL MEASUREMENT MACHINE FOR MEASURING A PREDOMINANTLY LONGITUDINALLY EXTENDED WORKPIECE

(71) Applicant: VICI & C. S.P.A., Santarcangelo di Romagna (IT)

(72) Inventors: Carlo Bedeschi, Rimini (IT); Stefano Andreini, Morciano di Romagna (IT); Paolo Maioli, Rimini (IT); Manuel Bartolini, Rimini (IT); Lanfranco Ferri, Bellaria Igea Marina (IT)

(73) Assignee: VIVI & C. S.P.A., Santarcangelo di Romagna (IT)

( * ) Notice: Subject to any disclaimer, the term of this patent is extended or adjusted under 35 U.S.C. 154(b) by 794 days.

(21) Appl. No.: 17/050,291

(22) PCT Filed: Apr. 18, 2019

(86) PCT No.: PCT/IB2019/053229
§ 371 (c)(1),
(2) Date: Oct. 23, 2020

(87) PCT Pub. No.: WO2019/207437
PCT Pub. Date: Oct. 31, 2019

(65) Prior Publication Data
US 2021/0116237 A1    Apr. 22, 2021

(30) Foreign Application Priority Data

Apr. 24, 2018   (IT) .................. 102018000004824
Oct. 5, 2018    (IT) .................. 102018000009215
Apr. 3, 2019    (IT) .................. 102019000005006

(51) Int. Cl.
   G01B 11/24   (2006.01)
   G01B 5/20    (2006.01)
   G01B 21/04   (2006.01)

(52) U.S. Cl.
   CPC ............ G01B 11/2433 (2013.01); G01B 5/20 (2013.01); G01B 21/047 (2013.01)

(58) Field of Classification Search
   CPC ............. G01B 11/2433; G01B 21/042; G01B 21/047; G01B 5/20; H01H 11/005; H01H 2231/012
   (Continued)

(56) References Cited

U.S. PATENT DOCUMENTS 5,505,003 A * 4/1996 Evans ................. G01B 5/20
                                              33/501.7
2010/0206068 A1   8/2010 Butter et al.
(Continued)

FOREIGN PATENT DOCUMENTS

DE     10319947 A1    11/2004
DE   102007013633 A1   9/2008
(Continued)

OTHER PUBLICATIONS

International Search Report and Written Opinion dated Jul. 3, 2019 from counterpart International Patent Application No. PCT/IB2019/053229.

*Primary Examiner* — Tri T Ton
(74) *Attorney, Agent, or Firm* — SHUTTLEWORTH & INGERSOLL, PLC; Timothy J. Klima

(57) ABSTRACT

An optical measuring machine for measuring an object having a mainly longitudinal extension includes a holding assembly for the object, a sensing optical assembly movable parallel to a longitudinal axis of the object in order to allow complete acquisition of an image representing it, a contact
(Continued)

probe connected to the optical assembly to move together with it along said longitudinal axis and movable with respect to the optical assembly orthogonally to the longitudinal axis, and sensor means configured to detect at least one angular position about the longitudinal axis of the holding assembly, an axial position along the longitudinal axis of the optical assembly and a radial position, orthogonal to the longitudinal axis, of the contact probe.

18 Claims, 7 Drawing Sheets

(58) Field of Classification Search
USPC ....... 356/111, 482, 486, 478, 485, 489, 490, 356/492, 493, 495, 496, 498–516
See application file for complete search history.

(56) References Cited

U.S. PATENT DOCUMENTS

| | | | | |
|---|---|---|---|---|
| 2010/0231923 | A1* | 9/2010 | Ge | G01M 11/025 356/601 |
| 2013/0300861 | A1* | 11/2013 | Neumann | G01B 11/24 348/135 |
| 2015/0142360 | A1* | 5/2015 | Bankhead | G01B 11/2441 702/85 |

FOREIGN PATENT DOCUMENTS

| | | |
|---|---|---|
| DE | 102010054742 A1 | 6/2012 |
| WO | 2014135721 A1 | 9/2014 |

* cited by examiner

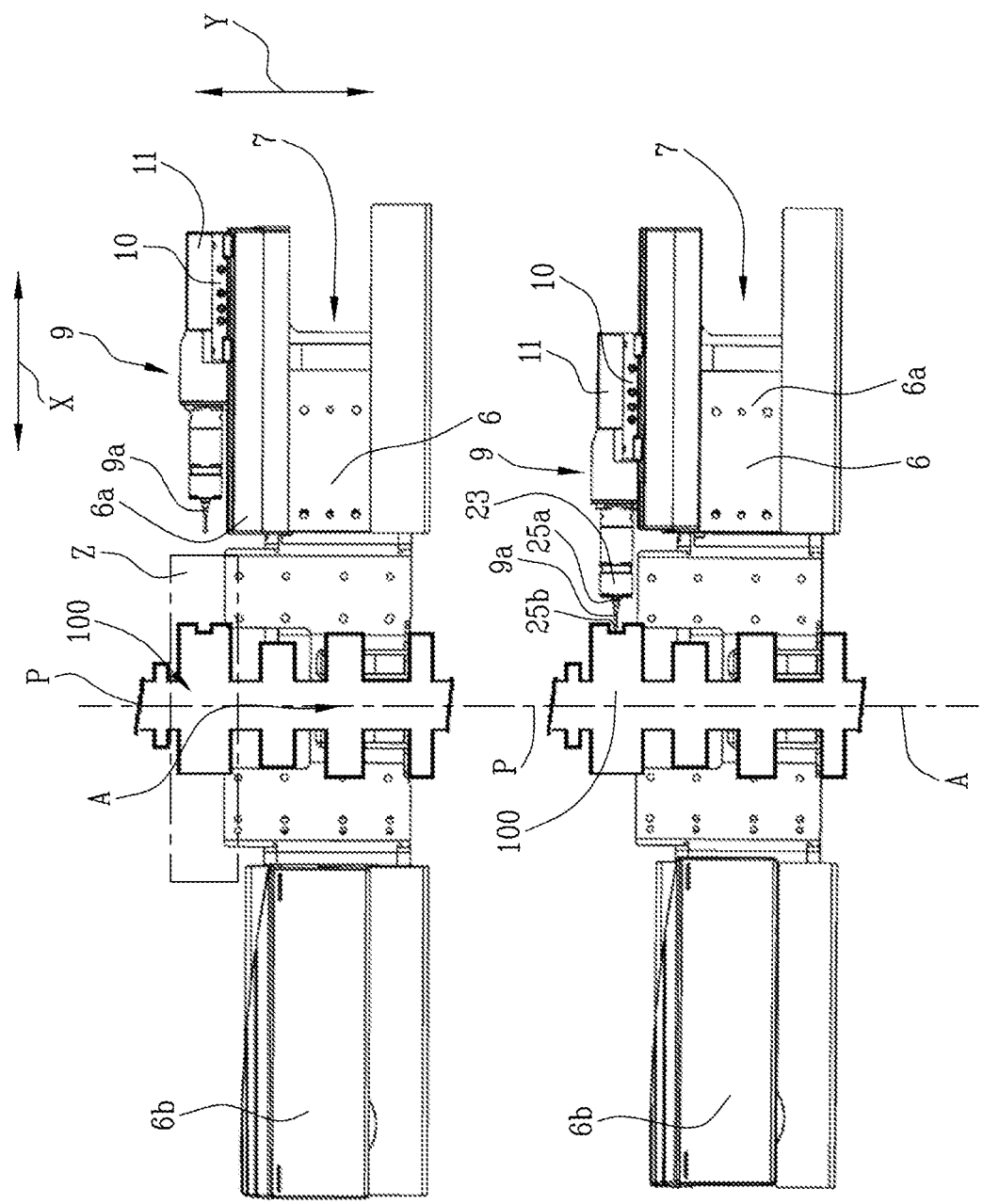

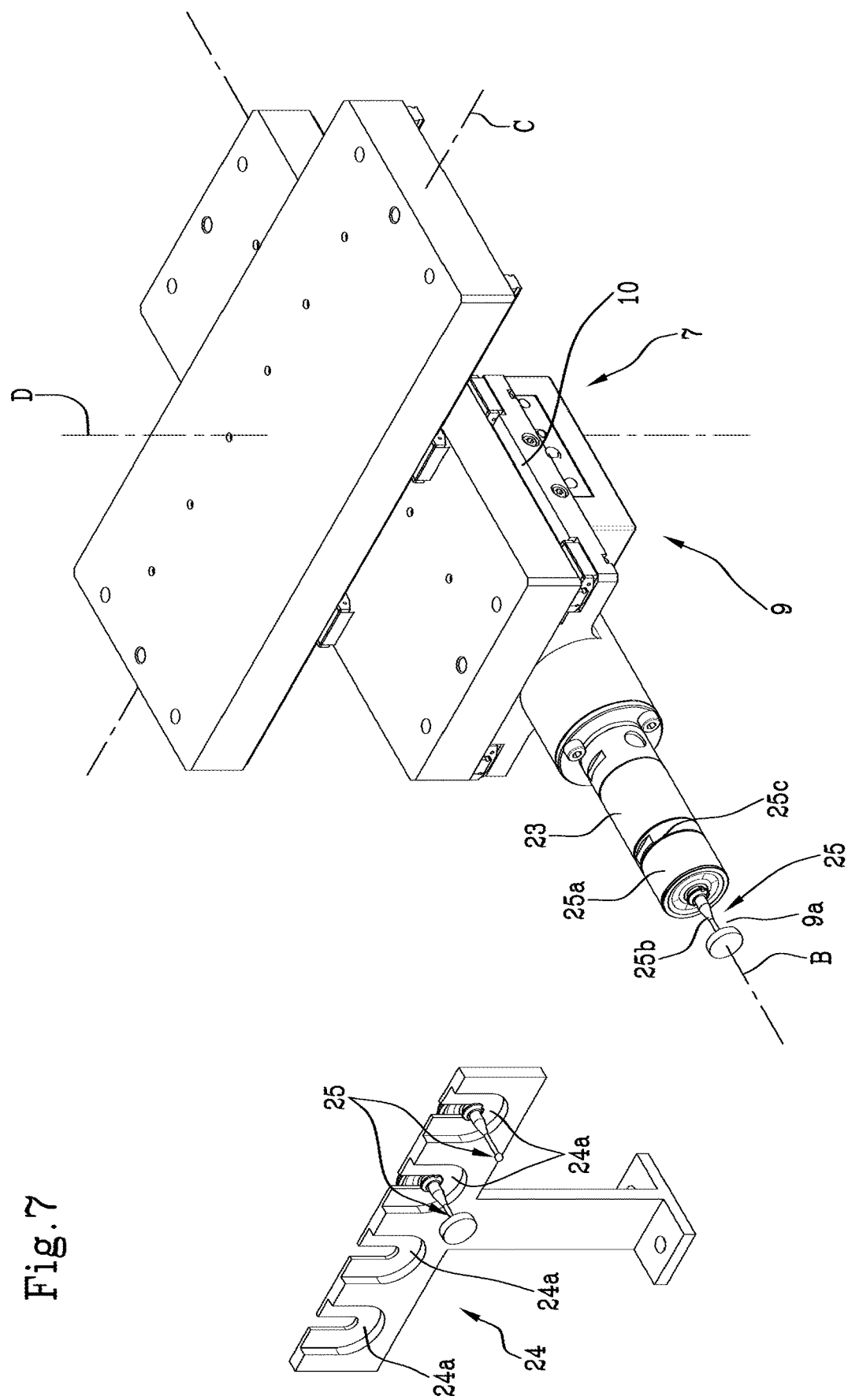

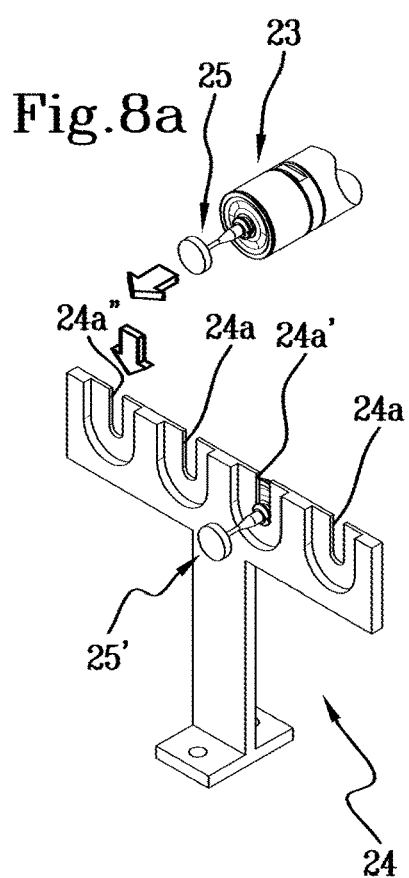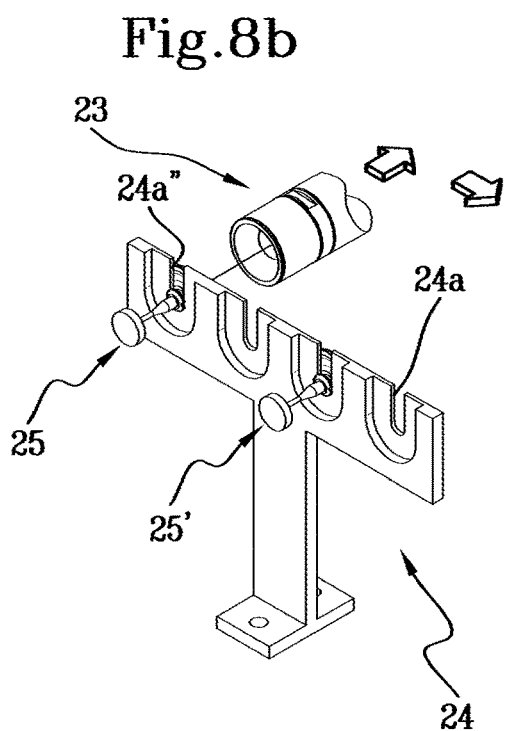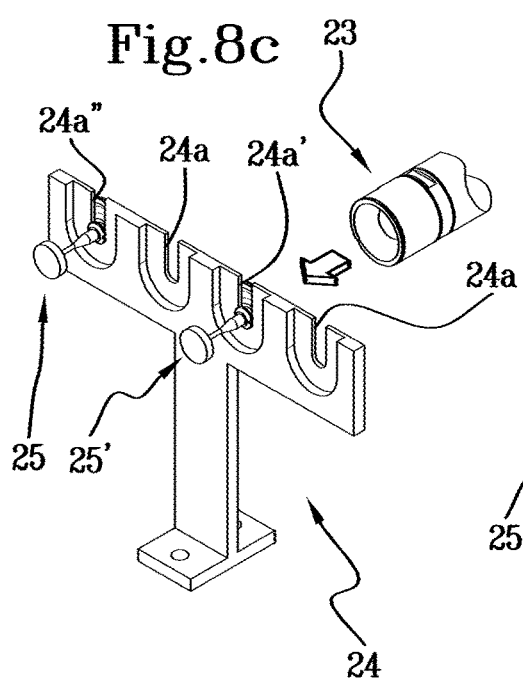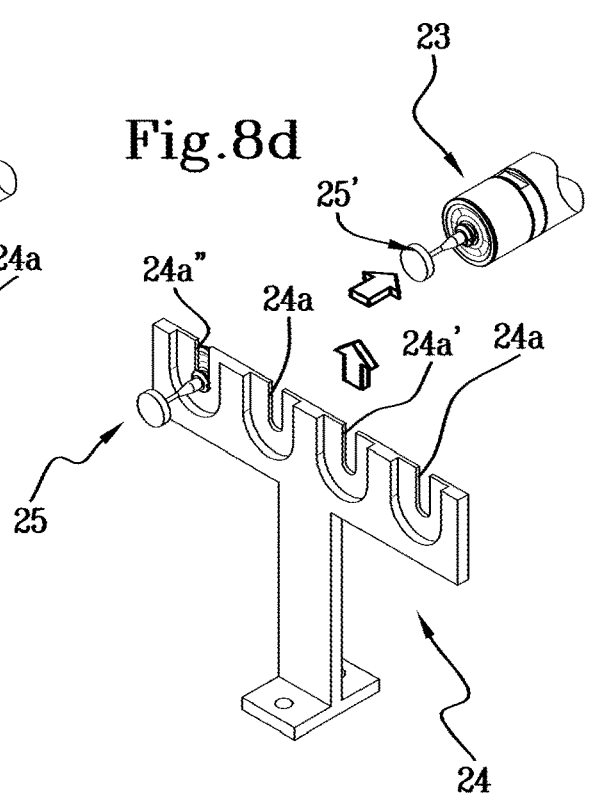

OPTICAL MEASUREMENT MACHINE FOR MEASURING A PREDOMINANTLY LONGITUDINALLY EXTENDED WORKPIECE

FIELD OF THE INVENTION

The present invention relates to an optical measuring machine for measuring an object having a mainly longitudinal extension.

This application is the National Phase of International Application PCT/EP2019/053229 filed Apr. 18, 2019 which designated the U.S.

This application claims priority to Italian Patent Application No. 102018000004824 filed Apr. 24, 2018, Italian Patent Application No. 102018000009215 filed Oct. 5, 2018 and Italian Patent Application No. 102019000005006 filed Apr. 3, 2019, which applications are incorporated by reference herein.

The present invention hence finds application in the technological field of metrology, in particular industrial metrology.

More precisely, the present invention finds its main application in providing measurement systems on board machines, which can allow dimensional assessment of newly processed/manufactured objects without having to transport the object to the dedicated metrology room.

BACKGROUND INFORMATION

With particular reference to the measurement of longitudinally extending objects, preferably of a rotational nature such as trees or the like, different types of optical machines are currently known, which are also successfully produced by the Applicant.

These machines generally have a pair of tailstocks (or other retention system) vertically aligned to hold the object upright, alongside which a "carriage" runs, which carries an illuminator on one side and a video detection system, such as for example a linear camera, on the other side.

Therefore, the principle of operation comprises making the measurements by detecting, by means of a receiver such as for example the aforementioned linear camera, the shadow that is created when the object is illuminated with a beam of parallel rays directed perpendicularly to its longitudinal axis.

However, this type of measurement, now well known, has application limitations in measuring dimensional features that are not optically detectable, i.e. that extend coaxially with the light beam and/or are hidden from it.

Examples of such elements are undercuts, keys, slots, blind bores or counterbores, which, although illuminated, do not result in something defined or definable as the shadow of the object.

In order to obviate this drawback, solutions have been proposed in the past in the prior art, which integrate the optical functions with at least one contact sensor capable of mechanically detecting the conformation of those features that are not "visible" to the optical system.

These solutions are currently on the market and, in fact, allow the range of objects "that can be accurately measured" to be considerably extended, which makes them highly appreciated by customers.

Disadvantageously, however, integration between the optical system and the contact system in most cases required a substantial reassessment of the movement algorithm.

More precisely, these solutions exploit a movement algorithm with interpolated axes, which is why the introduction of a new component equipped with its own (horizontal) movement system required an updating and a substantial modification of the interpolation law, with considerable impact on the complexity of electronics and the costs of the machine.

SUMMARY OF THE INVENTION

One object of the present invention is therefore to provide an optical measuring machine for measuring an object having a mainly longitudinal extension, which is capable of obviating the drawbacks of the above-mentioned prior art.

In particular, one object of the present invention is to provide an optical measuring machine for measuring an object having a mainly longitudinal extension, which is highly versatile and at the same time cost-effective.

Said objects are achieved by means of an optical measuring machine for measuring an object having a mainly longitudinal extension, which has the features of one or more of the subsequent claims.

In particular, such an optical measuring machine comprises a holding assembly for the object to be measured, provided with a pair of jaws aligned along a longitudinal axis and movable towards and/or away from each other between an open, release position and a closed, tightening position.

The holding assembly is rotatable about the longitudinal axis to rotate the object about its own axis.

The machine further comprises a sensing optical assembly provided with lighting means, configured to generate a light radiation, and video acquisition means aligned with each other along an optical path of said light radiation transverse and incident to said longitudinal axis.

The optical assembly is movable parallel to said longitudinal axis in order to allow complete acquisition of an image representing said object.

There is further provided a contact probe connected to said optical assembly to move together with it along said longitudinal axis and movable with respect to the optical assembly orthogonally to the longitudinal axis, towards and away from it between a resting position and an operating position.

The machine further comprises sensor means configured to detect at least one angular position $\alpha$ about the longitudinal axis of said holding assembly, an axial position Y along the longitudinal axis A of the optical assembly, and a radial position X orthogonal to said longitudinal axis of the contact probe.

A control unit is configured for receiving from the sensor means first signals representing respectively said angular, axial and radial positions, and for controlling the holding assembly, the optical assembly and the contact probe according to a preset measurement program.

According to one aspect of the present invention, the machine comprises a synchronization device configured for receiving in input said first signals representing respectively said angular position, axial position and radial position, receiving in input one or more second signals representing a contact condition of said contact probe with the object, combining said first signals and said one or more second signals in order to obtain a synchronized signal having an information content representative of the geometry of the object within a contact measurement area (i.e. wherein the contact probe interacts with said object), and sending said synchronized signal to said control unit.

Advantageously, the presence of a synchronization device acting upon movement allows a precise measurement of the object's geometry even in the absence of interpolation of the axes.

In this regard, in fact, the control unit is configured to control the optical assembly, the contact probe and the holding assembly independently of said one or more second signals.

These second signals are taken into consideration by the sole synchronization device and, by means of a simplified algorithm, translated into dimensional information precisely located on the object.

In accordance with a further aspect of the invention, independent and alternative to the preceding one, although potentially complementary to it, the machine includes a calibration body having a predetermined geometry defined by a plurality of reference walls and positionable in a qualification area accessible to said contact probe.

Preferably, the control unit is configured to control the contact probe and/or the calibration body according to a calibration program along said longitudinal direction and transversely to said longitudinal direction, in order to contact said reference walls.

Advantageously, in this way it is possible to recalibrate/reset the sensor directly on the machine by exploiting an element pre-loaded in the machine and a preset program.

Preferably, the calibration body is associated with said holding assembly and at least partly defined by a first jaw of said pair of jaws.

More preferably, the first jaw comprises a rotatable shaft extending along said longitudinal direction up to a terminal tailstock.

Preferably, the calibration body is formed on said shaft.

Advantageously, in this way, no further movement is required, other than those performed normally by the machine during measurement.

Preferably, in order to run said calibration program, the control unit is programmed to place the contact probe in the vicinity of said first calibration portion.

Preferably, it is envisaged to move said contact probe along the longitudinal direction, in a first and a second direction, until the contact probe abuts against said first transverse walls.

Preferably, it is also envisaged to move said contact probe transversely to the longitudinal direction to contact it with a body of said shaft.

Preferably, the control unit is then configured to move the contact probe and/or the holding assembly in order to place the contact probe in the vicinity of said second calibration portion.

Preferably, it is envisaged to rotate said holding assembly about said longitudinal axis in a first and a second direction of rotation, in order to contact the first longitudinal walls, in succession one after the other, with said contact probe.

Advantageously, this allows the conformation of the first jaw and the complementary movements of the probe and the movement assembly to be exploited to perform an accurate and fast calibration, greatly reducing maintenance and setup times.

According to a further aspect of the invention, independent and alternative to the preceding ones, although potentially complementary to them, the contact probe comprises a support body removably coupled to a sensing element comprising a constraint portion and an active portion mutually arranged in succession.

Preferably, the machine comprises a tool holder body provided with a plurality of individual seats for housing a corresponding plurality of sensing elements, wherein said control unit is configured to control the lifting assembly and said contact probe according to a tool substituting program.

Preferably, the tool substituting program provides that the sensing element is released into an individual free seat, and that a further sensing element, housed in another individual seat (24a'), is coupled to the support body.

Preferably, moreover, the contact probe is movable with respect to the optical assembly along a first operating direction and a second operating direction orthogonal to each other and to the longitudinal axis, wherein said first operating direction and said second operating direction are preferably oriented horizontally.

It should be noted that all the features mentioned above and hereinafter, relating to the synchronization device, the calibration procedure and the tool substituting program, are independent of each other and not necessarily related to each other, although their interaction is preferable to maximize the performance of the optical measuring machine.

BRIEF DESCRIPTION OF THE DRAWINGS

Further features and the related technical advantages will become more apparent from the following illustrative, therefore not limiting description of a preferred, thus not exclusive embodiment of an optical measuring machine for measuring an object having a mainly longitudinal extension, as illustrated in the accompanying figures, in which:

FIGS. 4a and 4b show a detail of the machine in FIG. 2 in two different operating configurations;

FIG. 7 shows a schematic perspective view of a contact probe and a tool holder body according to one aspect of the present invention;

FIGS. 8a-8e show schematic views representing a tool substituting procedure.

DETAILED DESCRIPTION

Figure 1:
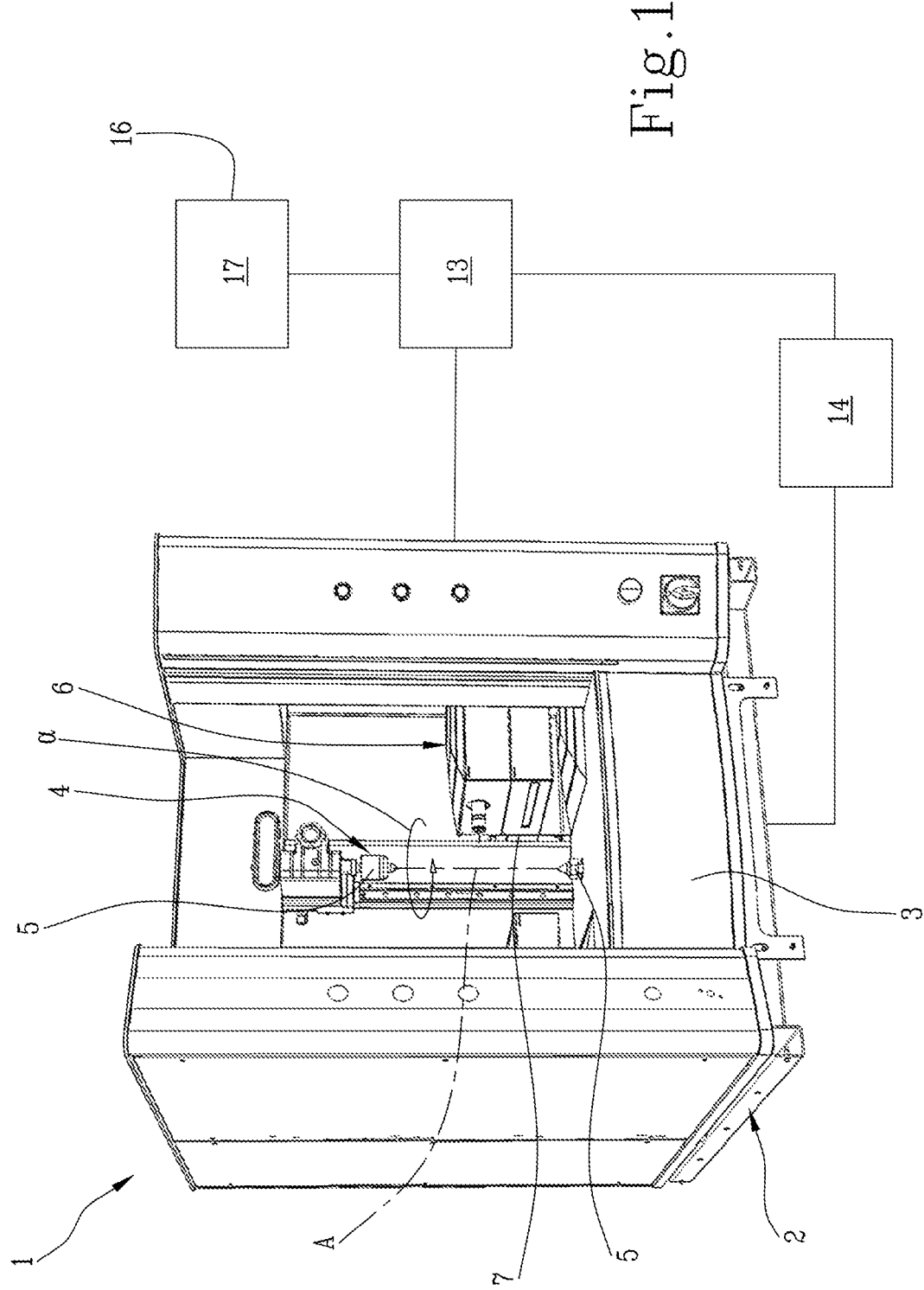
FIG. 1 shows a schematic perspective view of an optical measuring machine for measuring an object having a mainly longitudinal extension according to the present invention.
Figure 3:
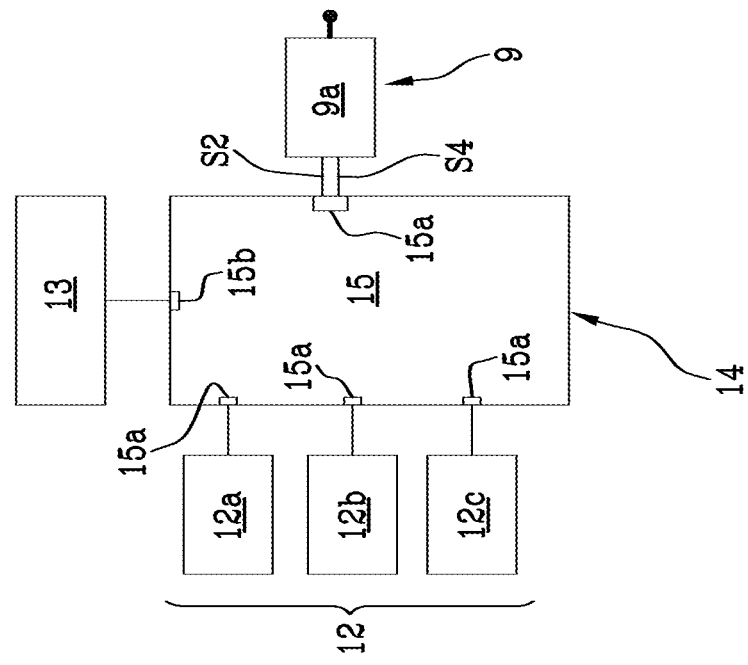
FIG. 3 is a schematic view of the connections of a detail of the machine shown in FIG. 2.
Figure 2:
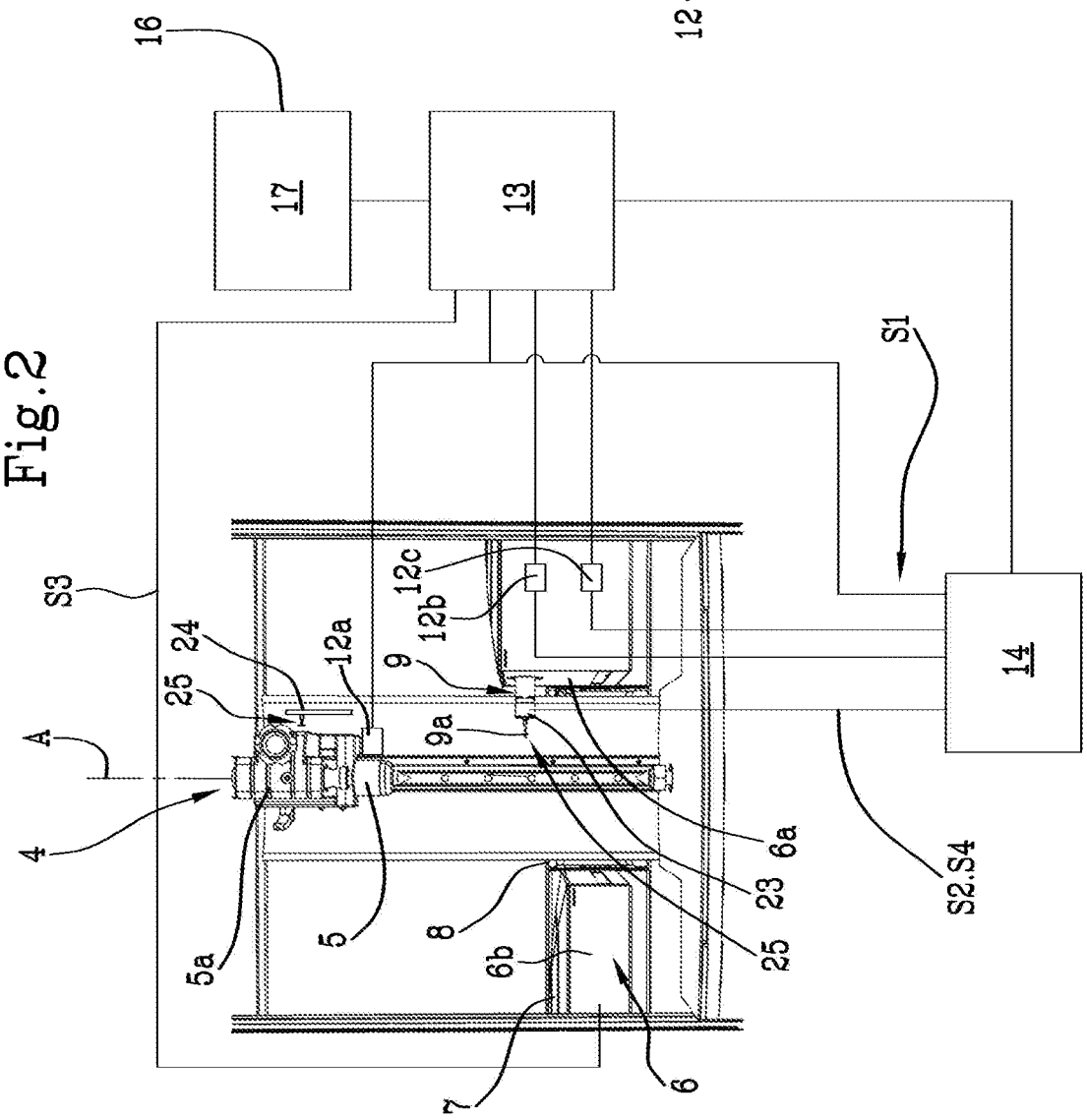
FIG. 2 shows a front view of a portion of the machine in FIG. 1.
Figure 5:
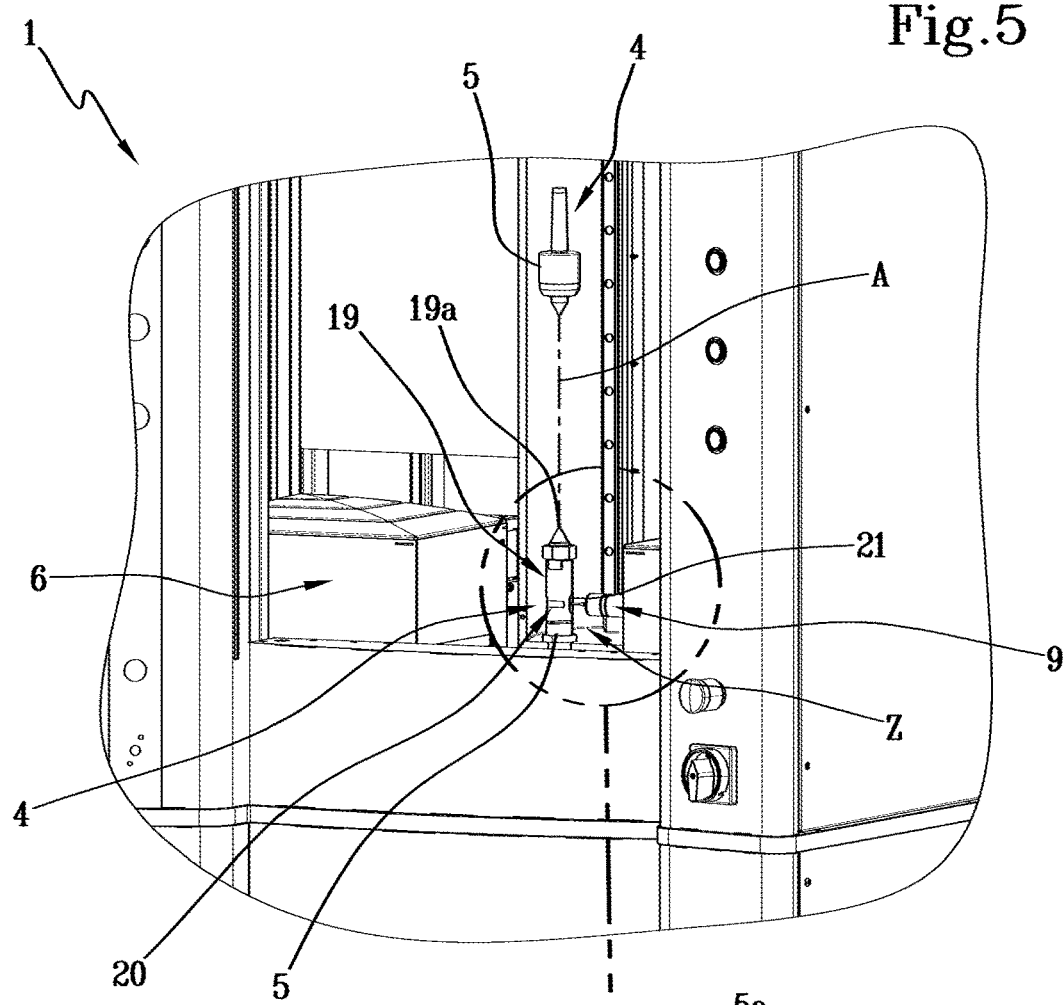
FIGS. 5, 5a, 6 and 6a show partial perspective views and respective details of a further embodiment of an optical measuring machine for measuring an object having a mainly longitudinal extension according to the present invention, in two different operating positions.
Figure 5A:
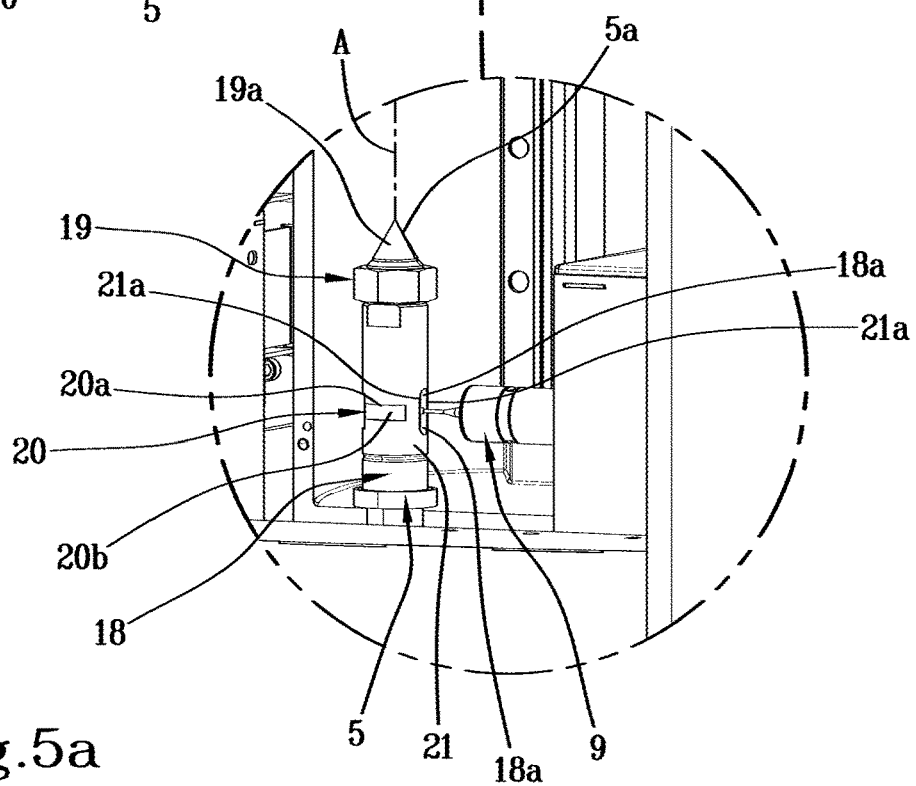
Figure 6:
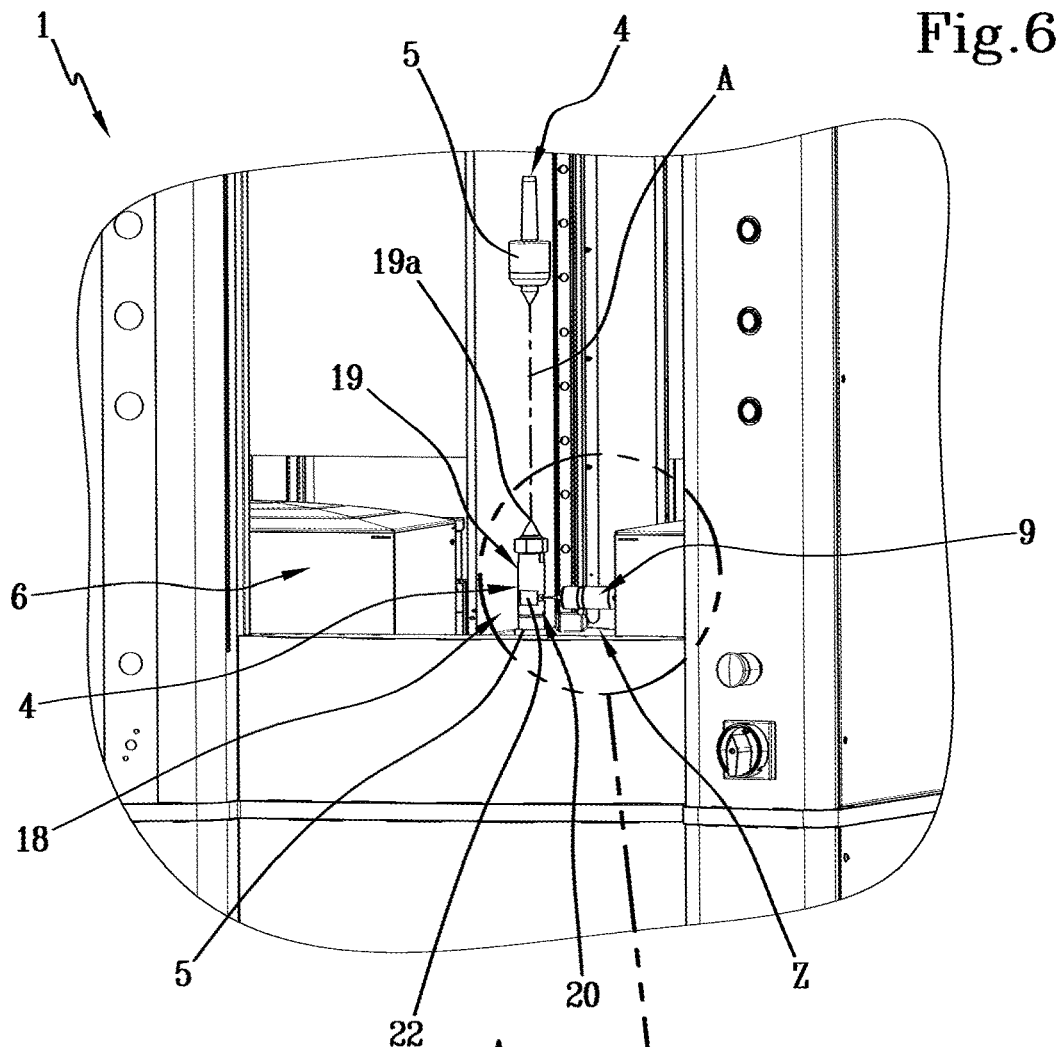
Figure 6A:
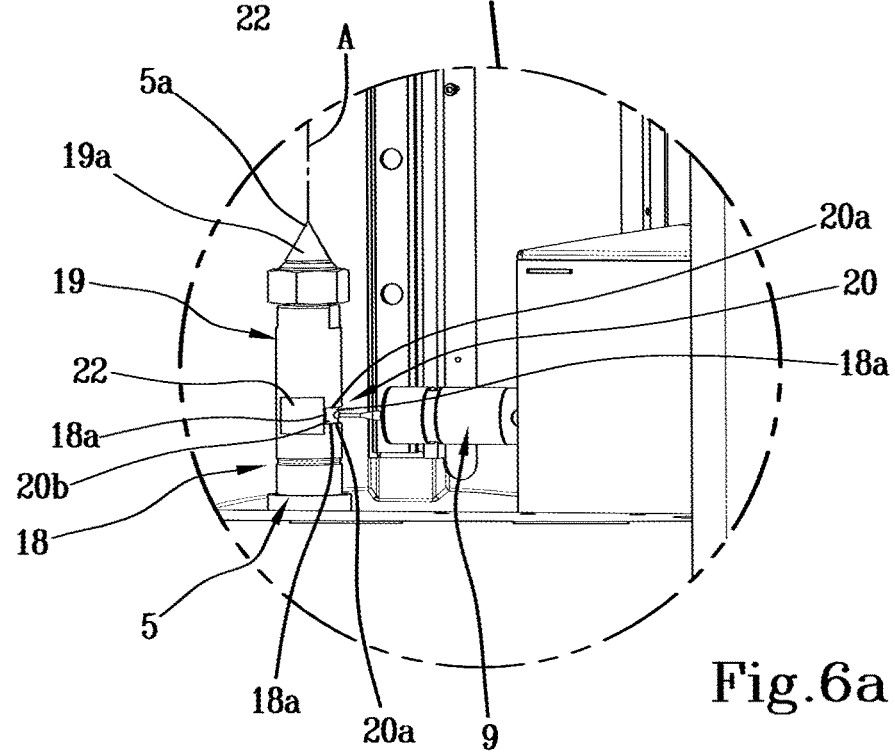

With reference to the accompanying figures, the numeral 1 indicates an optical measuring machine according to the present invention.

As previously mentioned, the machine 1 is mainly of the optoelectronic type, i.e. it exploits the interaction of the object with a light beam to detect the dimensional specifications thereof.

Such a machine is configured to mainly measure objects 100 having a longitudinal extension along their own main axis "P", preferably objects 100 in which said main axis "P", in use, defines a rotation axis, such as for example trees.

The machine 1 includes a support frame 2 having a base 3 shaped so as to allow the machine to be placed on a preferably horizontal resting surface.

The base preferably has a plurality of adjustable feet (not shown) to allow high-precision levelling with the resting surface, even when the latter has an irregular shape.

Generally, the machine 1 comprises a holding assembly 4 for said object 100, a sensing optical assembly 6, a contact probe 9, sensor means 12, and a control unit (controller) 13.

The holding assembly 4 is provided with a pair of jaws 5 aligned along a longitudinal axis "A", in use corresponding to said main axis "P" of the object 100 to be measured.

In the preferred embodiment, the longitudinal axis "A" is substantially vertical.

The jaws 5 are movable towards and/or away from each other between an open, release position and a closed, tightening position, in order to allow objects with different longitudinal extensions to be held.

In the preferred embodiment, these jaws 5 each comprise at least one tip 5a, which can be coupled to a respective longitudinal end of the object 100 at the main axis "P".

In other words, the holding assembly 4 is defined by two "tailstocks" (or by a tip-tailstock pair), a particularly effective and precise solution.

Preferably, the holding assembly 4 includes a first and a second jaw.

These jaws, or at least the first jaw, comprise(s) a rotatable shaft 19 extending along said longitudinal direction "A" up to a terminal tailstock or tip 19a.

In order to allow an object to be measured in all angular positions (as well as eccentricity or similar measurements to be made), the holding assembly 4 is rotatable about said longitudinal axis "A" so as to rotate said object 100 about its own main axis "P".

Preferably, the presence of a rotary actuator 5a associated with at least one of said jaws 5 is therefore provided.

In the preferred embodiment, the rotary actuator comprises an electric motor or electrospindle.

The sensing optical assembly 6 is provided with lighting means 6a, configured to generate a light radiation, and video acquisition means 6b aligned with each other along an optical path of said light radiation. Therefore, the lighting means 6a and the video acquisition means 6b are telecentric.

Such an optical path is transverse (preferably orthogonal) and incident to the longitudinal axis "A" so as to hit the object 100 to be measured.

In particular, the lighting means 6a and the video acquisition means 6b are arranged on opposite sides of the longitudinal axis "A", transversely to it, so that the light radiation emitted by the lighting means 6a hits the object 100 before it is detected (minus the shadow generated by the object 100) by the video acquisition means 6b.

The optical assembly 6 is thus configured to generate a third signal S3, representative of the shape of the object 100 detected by the video acquisition means 6b, and to place this third signal S3 at the disposal of the control unit 13.

In the preferred embodiment, the lighting means 6a comprise a LED light source and at least telecentric optics.

The video acquisition means 6b preferably comprise a camera.

It should be noted that, in order to allow complete acquisition of an image representing said object 100, the optical assembly 6 is movable parallel to said longitudinal axis "A".

For this purpose, the optical assembly 6 is mounted on a carriage 7 slidably associated with the frame 2 and movable along the longitudinal axis "A" (i.e. vertically).

Also provided is a lifting assembly 8 associated with the carriage 7 and configured to move it up and down along a lifting direction "D" parallel to the longitudinal axis "A" between a raised position and a lowered position.

On the other hand, the contact probe 9 is configured to detect the conformation of the object 100 by mechanically contacting the surface thereof.

In particular, the contact probe 9 is configured to generate one or more second signals S2 representing a contact condition thereof with the object 100.

Preferably, the contact probe 9 is connected to the optical assembly 6 to move together with it along said longitudinal axis "A".

More precisely, the contact probe 9 is constrained to the carriage 7 of the optical assembly 6, preferably at a height located outside said optical path of the lighting means 6a.

In order to come into contact with the object 100 to be measured, the contact probe 9 is also movable with respect to the optical assembly 6 orthogonally to the longitudinal axis "A".

More precisely, the contact probe 9 is movable towards and away from the longitudinal axis "A" (i.e. from the object 100), along a first operating direction "B" between a resting position and an operating position.

Therefore, the probe is movable vertically together with the optical assembly 6, i.e. with the carriage 7, and horizontally with respect to the optical assembly 6 (i.e. on the carriage 7).

Preferably, the "operating position" is not univocal, but can be suitably modified depending on the geometry of the object 100.

Preferably, therefore, the contact probe 9 is slidably constrained to the optical assembly 6, in particular to the carriage 7, by means of a linear guide 10 orthogonal to the longitudinal axis "A".

In order to allow the contact probe 9 to move, a linear actuator 11 is provided, which is operatively interposed between the contact probe 9 and the linear guide 10 and configured to move said contact probe 9.

Furthermore, in a preferred embodiment, the contact probe 9 is movable with respect to the optical assembly 6 transversally, preferably orthogonally, to the longitudinal axis "A".

Therefore, the contact probe 9 is preferably movable with respect to the optical assembly 6 along two mutually orthogonal directions, the first operating direction "B" and a second operating direction "C".

The first "B" and the second operating direction "C" are preferably horizontal and both orthogonal to the longitudinal axis "A".

Therefore, the contact probe 9 preferably comprises a support body 23 slidably constrained to the optical assembly 6, in particular to the carriage 7, by means of a first and a second linear guide orthogonal to each other.

A first and a second linear actuator are therefore provided, which are suitable to move the support body 23 of the contact probe 9 along the two operating directions "B", "C".

Preferably, the contact probe 9 comprises a sensing element 25 coupled to the support body 23 preferably in a removable manner.

In the preferred embodiment, the contact probe 9 is a measuring sensor 9a configured to provide at least three analogue signals. Therefore, the sensing element 25 preferably is a sensor.

The signals at least partly correspond to the second signals S2.

The machine 1 comprises sensor means 12 in order to detect all the positions of the movable elements (holding assembly 4, optical assembly 6, carriage 7, and contact probe 9).

These sensor means 12 are configured to detect:
at least one angular position α about the longitudinal axis of said holding assembly 4,
at least one axial position Y along the longitudinal axis "A" of the optical assembly 6;
at least one radial position X orthogonal to said longitudinal axis "A" of the contact probe 9.

These sensor means 12 are therefore configured to detect these quantities and provide first signals S1 representing the same.

In the preferred embodiment, the sensor means 12 therefore comprise at least one encoder 12a associated with the holding assembly 4 and a pair of optical linear scales 12a, 12b associated with the carriage 7 and the contact probe 9, respectively.

Therefore, the encoder 12a is configured to detect the angular position of the holding assembly 4 (i.e. of the object), whereas the optical linear scales 12b, 12c are configured to detect the longitudinal and the radial position of the optical assembly 6 and the contact probe 9, respectively.

Therefore, the control unit 13 is configured for receiving from the sensor means 12 the first signals S1 and for controlling the holding assembly 4, the optical assembly 6 and the contact probe 9 according to a preset measurement program.

More precisely, the control unit 13 is configured for controlling the rotary actuator 5a, the lifting assembly 8 and the linear actuator 11 according to said measurement program (and to said first signals).

The measurement program is preferably set as a sequence of movements along the longitudinal and radial axes, and as a rotation about the longitudinal axis according to the geometry of the object 100, or of a dimensioned drawing of the object 100, the real dimensions of which must be measured (i.e. verified).

The control unit 13 is further configured to determine a shape of the object 100 measured according to both the aforementioned first signals S1 and the third signal (or third signals) S3 coming from the optical assembly 6.

In other words, the control unit 13 is configured to process the first signals S1 and the third signal S3 according to a preset algorithm, so as to reconstruct the profile of the optically detected object 100.

According to one aspect of the present invention, the machine 1 further comprises a synchronization device 14 operatively interposed between said contact probe 9 and said control unit 13.

The synchronization device 14 is configured to receive in input said first signals S1 and said one or more second signals S2 representing the contact condition of the contact probe 9 with the object 100.

The synchronization device 14 is therefore configured to combine the first signals S1 and the second signals S2 in order to obtain a synchronized signal SS having an information content representative of the geometry of the object 100 within a contact measurement area, and to send the synchronized signal SS to the control unit 13.

It should be noted that the expression "contact measurement area" herein identifies that portion of the longitudinal stroke (or of the movement between the raised position and the lowered position) in which the contact probe 9 is activated, or in which the contact probe 9 interacts (or should interact) with said object 100.

Therefore, the control unit 13 is configured to control the optical assembly 6, the contact probe 9 and the holding assembly 4 independently of said one or more second signals S2.

Advantageously, in this way, the control of the machine 1 remains unchanged whether the contact probe 9 is present or not, thus facilitating the design and reducing development costs.

In fact, in this way the machine 1 is very versatile and does not require a complex interpolation of the axes with the parameters of the contact probe 9.

The presence of the synchronization device, in fact, determines a communication channel parallel to the "standard" control/detection channel of the machine 1, which determines the generation of an auxiliary signal with a differential (or additional) information content from/to that normally managed by the control unit 13.

This auxiliary signal corresponds to the synchronized signal, can easily be combined with the first signals S1 and the third signal S3 (from the video acquisition means 6b) for a complete reconstruction of the image of the object 100 and a precise location of the geometric features detected by the contact probe 9.

Preferably, therefore, the control unit 13 is configured for:
receiving said first signals S1 from said sensor means 12;
receiving said third signal S3 from said optical assembly 6;
receiving said synchronized signal SS from the synchronization device 14;
processing said signals in order to determine a complete shape of the object 100.

More precisely, during the operation of the machine 1, the control unit 13 is configured for:
activating the optical assembly 6 to detect a shape of the object 100 at a height along the longitudinal axis "A";
moving the optical assembly 6 along the longitudinal axis "A" to detect the complete shape of the object 100;
identifying, along the longitudinal axis "A", the contact measurement area;
moving the contact probe 9 transversely to the longitudinal axis "A" towards the operating position and according to a predetermined path (when the contact measurement area is identified);
returning the contact probe 9 to the resting position at the end of said predetermined path.

Again, it should be noted that, at least in normal (i.e. non-emergency) conditions, the control of the contact probe 9 by the control unit is preferably independent of said one or more second signals S2.

In this regard, it should be noted that the synchronization device 14 is also preferably configured to receive at least a fourth, emergency signal S4 and communicate to the control unit 13 an emergency condition upon receiving said at least a fourth signal S4.

In other words, the synchronization device 14 preferably only acts (indirectly) on the control of the actuators of the machine 1 in an emergency condition, for example if an end stop or a premature/excessive interference between the contact probe 9 and the object 100 is detected.

Preferably, the synchronization device 14 comprises an acquisition board 15 provided with a plurality of independent inputs 15a, adapted to receive said first S1 and second signals S2, and at least one output 15b connected to the control unit 13.

In particular, the acquisition board 15 is configured to send the synchronized signal SS (and/or the fourth signal S4) to the control unit 13 through said output 15b.

According to a further aspect of the present invention, the machine 1 comprises a calibration body 18 having a predetermined geometry defined by a plurality of reference walls 18a.

In other words, the calibration body 18 has a plurality of raised walls transversal to the longitudinal direction "A", which can be contacted by the contact probe 9.

This calibration body 18 is positionable, preferably positioned, in a qualification area "Z" accessible to the contact probe 9.

Preferably, the calibration body 18 is associated with said holding assembly 4 and at least partly defined by a first jaw of said pair of jaws 5.

Preferably, the calibration body 18 is formed on said rotatable shaft 19 of the first jaw.

This rotatable shaft 19 has a plurality of high-relief or bas-relief works defining said plurality of reference walls 18a.

Preferably, the calibration body 18 comprises at least a first calibration portion 20 provided with a pair of first transverse walls 20a orthogonal to the longitudinal axis "A".

These first transverse walls 20a, in use substantially horizontal, face each other and are arranged at different heights.

In the illustrated embodiment, the first calibration portion 20 is defined by a milling transverse to the longitudinal axis "A" and defined by a flat wall 20b and said two first transverse walls 20a.

Preferably, moreover, the calibration body 18 comprises at least a second calibration portion 21 provided with a pair of first longitudinal walls 21a parallel to the longitudinal axis "A" and facing each other.

These first longitudinal walls 21a are substantially vertical in use and extend parallel to the longitudinal axis "A".

In the illustrated embodiment, the second calibration portion 21 is defined by a longitudinal slot extending parallel to the longitudinal axis "A" in a (longitudinal) centreline area of said rotatable shaft 19.

Preferably, the first 20 and the second calibration portion 21 are arranged on opposite sides of the rotatable shaft 19, with reference to the longitudinal axis "A".

In other words, the first 20 and the second calibration portion 21 are preferably placed in distinct angular positions, preferably offset by an angle of between 60 and 180°.

Therefore, the first 20 and the second calibration portion 21 can lie facing the contact probe 9 only in distinct steps of the calibration.

Furthermore, in the preferred embodiment, there is provided a third calibration portion 22, preferably similar to the first 20, but having different dimensions in order to allow calibration/qualification of a different size probe.

According to one aspect of the invention, the control unit 13 is configured to control the contact probe according to a calibration program.

This calibration program provides a movement of the contact probe 9 and/or the calibration body 18 (preferably of the shaft 19) both along the longitudinal direction "A" and transversely to it, in order to contact said reference walls 18a.

More precisely, the control unit 13 is programmed to run the calibration program by moving the contact probe 9 and the rotatable holding assembly 4 so that said contact probe 9 contacts all the reference walls 18a.

In the preferred embodiment, during the execution of the calibration program, the control unit 13 is programmed to place the contact probe 9 in the vicinity of said first calibration portion 20.

Preferably, in a first step of the calibration program, it is envisaged to move the contact probe 9 along the longitudinal direction "A" (preferably vertical in use), in a first and a second direction, until the contact probe 9 abuts against said first transverse walls 20a.

In other words, starting from a neutral position interposed between said two first transverse walls 20a, the contact probe 9 is moved (by the linear actuator 11) in a first direction, until it contacts a first transverse wall 20a.

Subsequently, the contact probe is moved in the second direction, opposite to the first, back over the portion previously travelled in the first direction and until it contacts the other first transverse wall 20a.

Furthermore, the control unit is configured to move the contact probe 9 transversely to the longitudinal direction "A" to contact it with a body of said shaft 19.

More precisely, the contact probe 9 is moved along this direction (horizontal in use) until it intercepts the flat wall 20a of the first calibration portion 20.

In a second step of the calibration program, the contact probe 9 is placed in the vicinity of the second calibration portion 21.

Preferably, the control unit 13 rotates the holding assembly 4, or at least the first jaw, about the longitudinal axis "A" so as to place the second calibration portion 21 in front of the contact probe 9.

In the preferred embodiment, the contact probe 9 is preliminarily moved away from the shaft 19 in order to avoid collisions.

Subsequently, the probe 9 is placed between the two first longitudinal walls 21a of the second calibration portion 21. More precisely, the contact probe 9 is inserted in the slot.

Furthermore, the holding assembly 4 is rotated about the longitudinal axis "A" in a first and a second direction of rotation, to contact the first longitudinal walls, in succession one after the other, with said contact probe 9.

In particular, starting from a neutral position of the contact probe 9 interposed between said two first longitudinal walls 21a, the rotatable shaft 19 is moved (by the rotary actuator 5a) in a first direction of rotation, until the probe 9 contacts a first longitudinal wall 21a.

Subsequently, the rotatable shaft 19 is moved in the second direction of rotation, opposite to the first, back over the portion previously travelled in the first direction of rotation until the contact probe 9 contacts the other first longitudinal wall 21a.

Preferably, the first and the second step of the calibration program are repeated several times, in order to detect a plurality of first detection data representing the position of the contact sensor, and a plurality of second detection data representing the angular position of the shaft 19.

The control unit 13 is preferably programmed to interrelate the first and the second detection data in order to generate a qualification function designed to allow the conversion of analogue signals (current, voltage, etc.) detected by the sensor into measurement and position parameters (millimetres, degrees, etc. . . . ).

Advantageously, in this way it is possible to carry out a simple and quick calibration of the contact probe 9, working in line and without having to replace or handle the calibration body 18.

Preferably, moreover, the machine 1 comprises a control module 16 associated with the control unit 13 and configured for determining said preset measurement program (and said predetermined path) and/or said calibration program;

controlling accordingly said holding assembly 4, said optical assembly 6 and said contact probe 9.

Preferably, a user interface device 17 is provided, which is associated with the control module 16 and configured to allow a user to enter one or more representative data of said measurement program and/or said calibration program.

In the preferred embodiment, the user interface device 17 and the control module 16 are defined by a PC or processor to which an authorized user can connect/log in in order to set and verify the measurement.

According to a further aspect of the present invention, the optical machine 1 comprises an automatic tool substituting function associated with the contact probe 9, better described hereinafter.

Therefore, according to this aspect of the invention, the support body 23 and the sensing element 25 of the contact probe 9 are removably coupled to each other.

Therefore, the sensing element 25 comprises a constraint portion 25a and an active portion 25b mutually arranged in succession.

The constraint portion 25a, in use, is coupled to the support body 23 through a coupling element 25c and interposed between said support body 23 and the active portion 25b.

The active portion 25b is preferably defined by a probe, which can have different sizes and/or functionalities depending on the application and the operational needs of the machine 1.

The support body 23, in turn, comprises at least one seat for housing the coupling element 25c of the constraint portion 25a of the sensing element 25.

This housing seat is preferably shaped to ensure a quick connection to the coupling element 25c of the sensing element 25.

Preferably, therefore, the support body 23 and the sensing element 25 comprise quick-coupling means configured to allow quick connection between the two.

These quick-coupling means may comprise a snap-fit connection system, a bayonet coupling or the like, which are per se known.

To allow the implementation of a tool substituting procedure, the optical machine 1 comprises a tool holder body 24 provided with a plurality of individual seats 24a for holding/housing a corresponding plurality of sensing elements 25.

Therefore, in use, the tool holder body 24 houses a plurality of sensing elements 25, each removably housed in a respective individual seat 24a.

In the preferred embodiment, the tool holder body 24 is constrained to the frame 2 of the machine 1, in a position located outside a measurement area.

With reference to what is shown in FIG. 7, the tool holder body 24 is arranged at a greater height than the upper jaw 5 of the holding assembly 4.

Preferably, the tool holder body 24 is at least partly defined by a rack extending parallel to said second operating direction "C", in which the individual seats 24a are arranged in succession along this direction.

More preferably, the individual seats 24a are shaped so as to hold each sensing element with an orientation substantially parallel to the first operating direction "B" of the contact probe 9.

In particular, each individual seat 24a is shaped so as to hold the constraint portion 25a with the coupling element 25c accessible from said first operating direction "B".

Therefore, when the sensing element 25 is housed in its individual seat 24a, the coupling element 25c is preferably oriented horizontally along the first operating direction "B", facing the carriage 7.

Advantageously, this arrangement allows an automated tool substituting procedure to be performed by exploiting the actuators already present in the machine 1, i.e. the lifting assembly 8 and the linear actuators active in the first "B" and the second operating direction "C" of the contact probe 9.

Therefore, according to this aspect of the invention, the control unit 13 is configured to control the contact probe 9 according to a tool substituting program wherein the sensing element 25 is released into an individual free seat 24a" and a further sensing element 25', housed in another individual seat 24a', is coupled to the support body 23.

This tool substituting program provides a movement of the contact probe 9 such as to bring it close to the tool holder body 24.

With reference to FIGS. 8a-8e, a preferred embodiment of the tool substituting program is shown.

In particular, the tool substituting program managed by the control unit 13 preferably provides one or more of the following steps:

activating the lifting assembly 8 to bring the carriage 7, and particularly the contact probe 9 to a tool substituting height "Q" substantially aligned with the tool holder body 24;

activating the second linear actuator to bring the sensing element 25 of the contact probe 9 into a position in which the active portion 25b is substantially aligned with said free individual seat 24a";

activating the first linear actuator to bring the sensing element 25 of the contact probe 9 close to the individual free seat 24a";

positioning the constraint portion 25a of the sensing element 25 in the free individual seat 24a", preferably lowering it from above by moving the lifting assembly 8;

detaching the sensing element 25 from the support body 23, preferably operating, under detachment conditions, said quick-coupling means;

activating the first and the second linear actuator in order to bring the sensing element 25 of the contact probe 9 into abutment against the further sensing element 25' arranged in said other individual seat 24a'. Preferably, the first linear actuator is first activated to move the support body 23 away from the tool holder body 24; subsequently, the second linear actuator is operated to move the support body 23 into a position aligned with said other individual seat 24a', and finally the first linear actuator is operated again to engage the support body 23 in the constraint portion 25a of said further sensing element 25';

moving again the lifting assembly 8 and/or the first linear actuator and/or the second linear actuator to transfer the contact probe 9 provided with the further sensing element 25' into said measurement area. In particular, the lifting assembly 8 is operated to lift the support body 23 and extract the further sensing element 25' constrained thereto from the individual seat 24a; after which, the first and/or the second linear actuator is/are operated to bring the probe back into contact in the resting position.

The invention achieves the intended objects and attains important advantages.

In fact, the presence of a synchronization device, configured to detect "in parallel" the geometry of the features measured by the contact probe and synchronize these measurements with the data already available to the control unit, allows the integration of a sensor into the optoelectronic measuring machine to be high-performance and efficient, while not having a decisive impact on the cost of production and/or sale.

Furthermore, the presence of a calibration body on board the machine and of a simple calibration program, allows the qualification of the sensor to be sped up, increasing the efficiency and accuracy of the measurements.

The invention claimed is:

1. An optical measuring machine for measuring an object having a mainly longitudinal extension, comprising:
a holding assembly for said object provided with a pair of jaws aligned along a longitudinal axis and movable towards and/or away from each other between an open, release position and a closed, tightening position; said holding assembly being rotatable about said longitudinal axis to rotate said object about an axis of the object;
a sensing optical assembly including a lighting device, configured to generate a light radiation, and a video acquisition device, including a camera, aligned with the lighting device along an optical path of said light radiation transverse and incident to said longitudinal axis; said optical assembly being movable parallel to said longitudinal axis in order to allow complete acquisition of an image representing said object;
a contact probe connected to said optical assembly to move together with the optical assembly along said longitudinal axis and movable with respect to the optical assembly orthogonally to the longitudinal axis, towards and away from the optical assembly between a resting position and an operating position;
a sensor configured to detect at least one angular position about the longitudinal axis of said holding assembly, an axial position along the longitudinal axis of the optical assembly and a radial position, orthogonal to said longitudinal axis, of the contact probe;
a controller configured for:
receiving from the sensor first signals representing respectively said angular position, said axial position and said radial position,
controlling the holding assembly, the optical assembly and the contact probe according to a preset measurement program set as a sequence of movements of the sensing optical assembly and/or of the contact probe along the longitudinal axis, a radial axis and of the holding assembly about the longitudinal axis according to a geometry of the object;
a synchronization device including a further controller, an input and an output and configured for:
receiving in the input said first signals representing respectively said angular position, axial position and radial position,
receiving in the input one or more second signals representing a contact condition of said contact probe with the object,
combining said first signals and said one or more second signals to obtain a synchronized signal having an information content representative of a geometry of the object within a contact measurement area wherein the contact probe interacts with said object;
sending via said output said synchronized signal to said controller;
wherein said controller is configured to control the optical assembly, the contact probe and the holding assembly independently of said one or more second signals.

2. The optical measuring machine according to claim 1, wherein said optical assembly is configured to generate a third signal representative of a shape of the object detected by the video acquisition device; said controller being configured for:
receiving said first signals from said sensor;
receiving said third signal from said optical assembly;
receiving said synchronized signal from the synchronization device;
processing said signals to determine a complete shape of the object.

3. The optical measuring machine according to claim 1, wherein said controller is configured for:
activating the optical assembly to detect a shape of said object at a height along said longitudinal axis;
moving the optical assembly along said longitudinal axis to detect a complete shape of the object;
identifying, along said longitudinal axis, said contact measurement area;
moving said contact probe transversely to the longitudinal axis towards the operating position and according to a predetermined path when the contact measurement area is identified;
returning the contact probe to the resting position at an end of said predetermined path.

4. The optical measuring machine according to claim 1, wherein said synchronization device comprises an acquisition board including a plurality of independent inputs, adapted to receive said first and said one or more second signals.

5. The optical measuring machine according to claim 1, and further comprising a control module associated with the controller and configured for:
determining said preset measurement procedure and said predetermined path;
controlling accordingly said holding assembly, said optical assembly and said contact probe.

6. The optical measuring machine according to claim 5, and further comprising a user interface device associated with the control module and configured to allow a user to enter one or more representative data of said preset measurement procedure.

7. The optical measuring machine according to claim 1, wherein said contact probe is slidably constrained to said optical assembly by a linear guide orthogonal to the longitudinal axis.

8. The optical measuring machine according to claim 1, wherein said synchronization device is also configured for:
receiving a fourth, emergency signal;
communicating to the controller an emergency condition upon receiving said fourth, emergency signal.

9. The optical measuring machine according to claim 8, wherein said contact probe is a measuring sensor configured to provide three analogue signals defining said one or more second signals and/or said fourth, emergency signal.

10. The optical measuring machine according to claim 1, wherein said contact probe comprises a support body removably coupled to a sensing element comprising a constraint portion and an active portion mutually arranged in succession.

11. The optical measuring machine according to claim 10, and further comprising a tool holder body including a plurality of individual seats for housing a corresponding plurality of sensing elements, wherein said controller is configured to control a lifting assembly and said contact probe according to a tool substituting procedure wherein one of the sensing elements is released into an individual free seat and a further one of the sensing elements, housed in another individual seat, is coupled to the support body.

12. The optical measuring machine according to claim 11, wherein the contact probe is movable with respect to the optical assembly along a first operating direction and a second operating direction orthogonal to each other and to the longitudinal axis, wherein said first operating direction and said second operating direction are oriented horizontally.

13. The optical measuring machine according to claim 12, wherein, to execute said tool substituting procedure, the controller is configured for:
- activating the lifting assembly to bring the contact probe to a tool substituting height substantially aligned with the tool holder body;
- positioning the one of the sensing elements into said individual free seat;
- detaching the one of the sensing elements from the support body;
- bringing the support body of the contact probe into abutment against the further one of the sensing elements arranged in said another individual seat.

14. The optical measuring machine according to claim 1, and further comprising a calibration body having a predetermined geometry defined by a plurality of reference walls and positionable in a qualification area accessible to said contact probe; said controller being configured to control said contact probe and/or said calibration body according to a calibration procedure along said longitudinal direction and transversely to said longitudinal direction in order to contact said reference walls.

15. The optical measuring machine according to claim 14, wherein said calibration body is associated with said holding assembly and at least partly defined by a first jaw of said pair of jaws.

16. The optical measuring machine according to claim 15, wherein said first jaw comprises a rotatable shaft extending along said longitudinal direction up to a terminal tailstock; said calibration body being formed on said shaft.

17. The optical measuring machine according to claim 16, wherein said shaft comprises a plurality of high-relief or bas-relief works defining said plurality of reference walls.

18. The optical measuring machine according to claim 14, wherein said controller is programmed to run the calibration procedure by moving the contact probe and said rotatable holding assembly so that said contact probe contacts all the reference walls.

* * * * *